Feb. 6, 1962   J. B. JOHNSTON   3,019,888
CONTAINER CONVEYOR
Filed Dec. 9, 1959   2 Sheets-Sheet 1
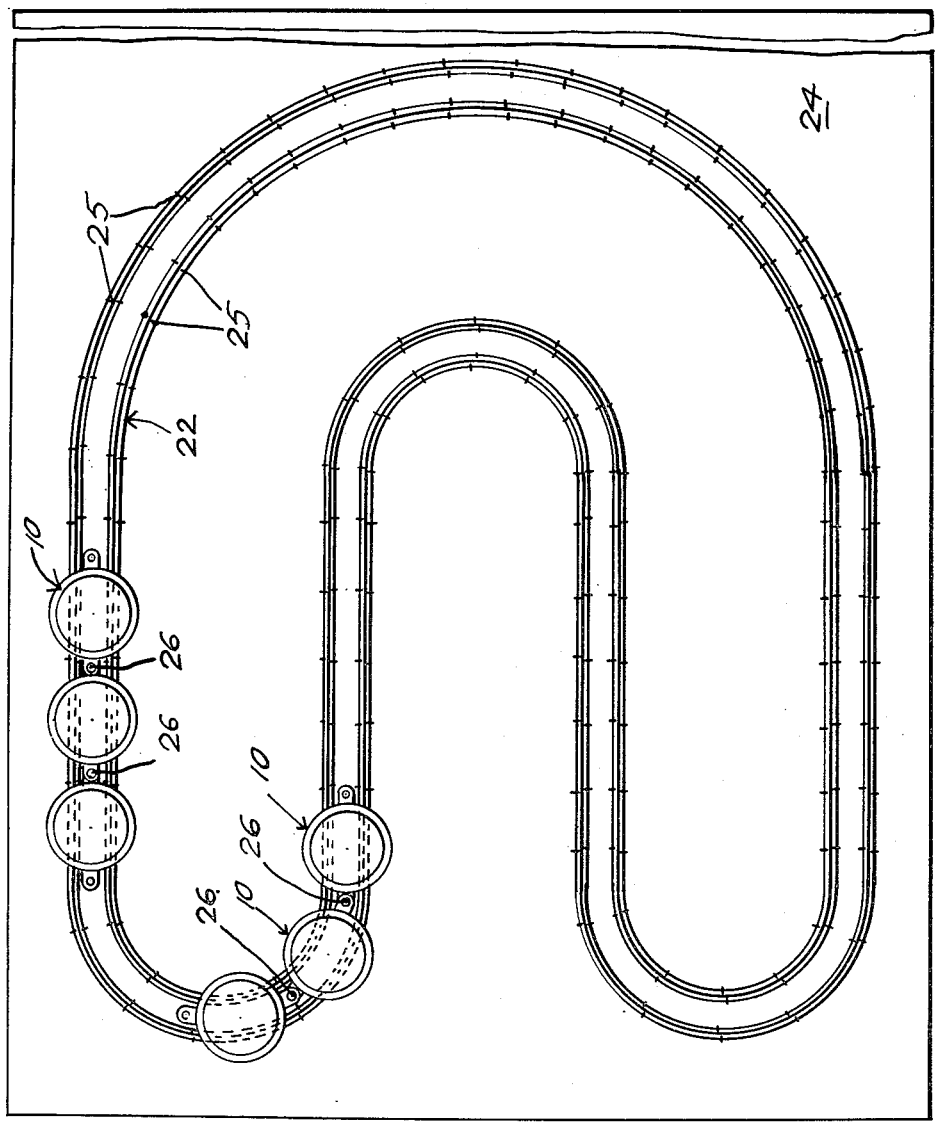
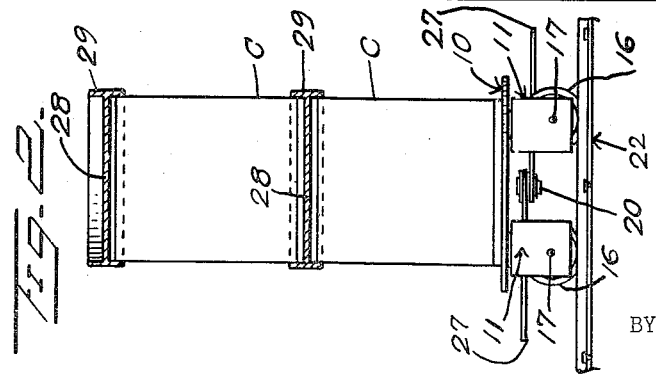
J. B. JOHNSTON
INVENTOR
BY C. A. Snow & Co.
ATTORNEYS.

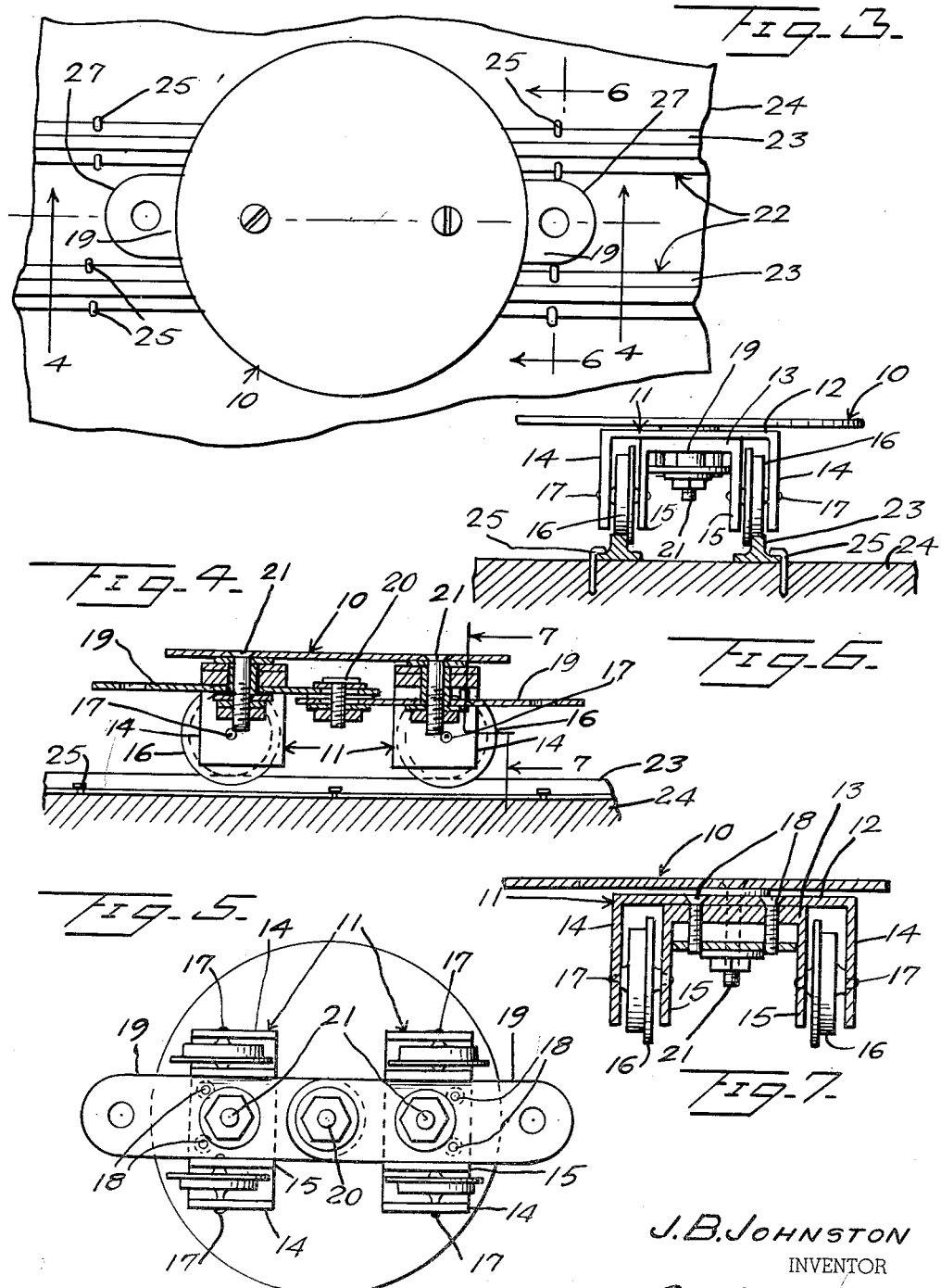

United States Patent Office 3,019,888
Patented Feb. 6, 1962

3,019,888
CONTAINER CONVEYOR
James B. Johnston, 320 37th St., Sacramento, Calif.
Filed Dec. 9, 1959, Ser. No. 858,517
2 Claims. (Cl. 198—181)

This invention relates to conveyors, and more particularly to conveyors for conveying containers and the like for cabinets or cupboards in homes.

It is well known to those experienced in the art of stacking containers or articles on shelves that time is consumed and considerable difficulty experienced when it is necessary to obtain one of the containers or articles from the back row on the shelf which has been completely stocked.

It is therefore one of the principal objects of this invention to provide a container conveyor in the form of a miniature truck or plurality of trucks which are pivotally connected and operate over a track mounted on a shelf, the containers being stacked on the aforesaid trucks for transportation to convenient positions for removal.

Another object of this invention is to provide a container conveyor with means for navigating the trucks around sharp turns in the tracks, thereby making it possible to mount this invention on narrow shelves.

Another object of this invention is to provide a container conveyor that can be readily mounted on any shelf, regardless of its size, construction or material.

Still another object of this invention is to provide a container conveyor having a plurality of trucks removably secured together end to end, so that their carrying capacity may be increased or decreased as desired.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit and intent of the invention as claimed.

Referring to the drawings:

FIGURE 1 is a plan view of this invention.

FIG. 2 is a side view of a portion of this invention showing containers stacked on the same.

FIG. 3 is a plan view of one of the container cars and a portion of the track.

FIG. 4 is a sectional view taken substantially along the line 4—4 of FIG. 3 as viewed in the direction indicated by the arrows.

FIG. 5 is a plan view of the understide of one of the container cars looking upwardly from underneath the same.

FIG. 6 is a sectional view taken substantially along the line 6—6 of FIG. 3 as viewed in the direction indicated by the arrows.

FIG. 7 is a sectional view taken substantially along the line 7—7 of FIG. 4 as viewed in the direction indicated by the arrows.

Similar reference characters refer to similar parts throughout the several views of the drawings.

Having reference now to the drawings in detail, and in particular to FIGS. 4, 5 and 7, there is generally indicated by the reference character 10 a plurality of flat top container cars, each one of which embodies a pair of trucks 11 that in turn comprise a pair of inverted U-shaped members 12 and 13 that have downwardly extending legs 14 and 15.

Wheels 16 are rotatably mounted on axles 17 supported by the aforementioned legs 14 and 15, thus placing the said wheels 16 between the two legs as clearly shown in FIGS. 6 and 7 of the drawings. The stated inverted U-shaped members 12 and 13 are secured together in a nested position by means of flat head screws 18 which also hold tongue 19 which has one end pivotally secured to the tongue of the other one of the pair of trucks 11 by a screw 20. Each of the trucks 11 is pivotally secured to the underside of the stated car 10 by a flat head machine screw 21 or its equivalent. Each of the cars 10 is now placed on a track 22 which comprises a pair of parallel rails 23 secured to a board 24 by a plurality of small nails 25 or their equivalents.

The entire assembled invention is now placed on any shelf where it is ready for use by placing cans (C) on a container car 10 and moving it anywhere along the track 22 as desired, the track having a configuration that is shown in FIG. 1 of the drawing whereby it can readily be seen that the assembly embodies a plurality of cars 10 secured together by pins 26 passing downwardly through openings in the outer ends 27 of the tongues 19. Thus many cars 10 may be connected together as desired in order that any number of articles (C) can be moved into the desired position along the shelf. Since the track 22 has a U-shaped plan form in part, containers on the front part of the shelf may be moved with ease, and desired ones on the back part of the shelf readily moved into a more accessible position. Each car 10 may carry more than one container (C) simply by stacking the containers one on top of the other, as shown in FIG. 2 of the drawings, where it is to be noted that a retainer 28 having an upper and lower edge 29 around its periphery is placed between the containers, the edge 29 thus keeping the containers in line and preventing them from toppling over.

From the foregoing it will now be seen that there is herein provided an improved container conveyor which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

1. A container conveyor comprising an endless track secured to a base for placement on a shalf, a plurality of flat top container cars operating on said track, each car embodying a pair of trucks rotatably secured to the under side of said cars, each of said trucks embodying a pair of inner and outer inverted U-shaped members fitted one within the other, said inverted U-shaped members having downwardly extended legs, the legs of said U-shaped outer member being spaced from the legs of the inner U-shaped member, providing wheel spaces therebetween, wheels operating within said wheel spaces, said wheels having axles secured to said downwardly extended legs, said wheels supporting said cars on said track, and mechanical mechanism connecting adjacent cars together.

2. The subject matter as claimed in claim 1, and said mechanical mechanism connecting adjacent cars embodying tongues pivotally secured between the legs of said inner inverted U-shaped members intermediate the ends of said tongues, the adjacent inner ends of said tongues being overlapped, and a bolt pivotally connecting the overlapped ends of said tongues.

References Cited in the file of this patent

UNITED STATES PATENTS 1,511,662     Dirkson et al. _____ Oct. 14, 1924